United States Patent
Lin

(10) Patent No.: US 7,661,885 B2
(45) Date of Patent: Feb. 16, 2010

(54) BALL BEARING ASSEMBLY FOR BICYCLE

(75) Inventor: Wen-Hwa Lin, Taichung Hsien (TW)

(73) Assignee: VP Components Co., Ltd., Taichung Hsien (TW)

( * ) Notice: Subject to any disclaimer, the term of this patent is extended or adjusted under 35 U.S.C. 154(b) by 470 days.

(21) Appl. No.: 11/648,517

(22) Filed: Jan. 2, 2007

(65) Prior Publication Data

US 2008/0159678 A1    Jul. 3, 2008

(51) Int. Cl.
*F16C 13/00* (2006.01)
(52) U.S. Cl. .................................. 384/545; 384/458
(58) Field of Classification Search ................ 384/545, 384/538, 458; 74/551.1; 280/279, 280
See application file for complete search history.

(56) References Cited

U.S. PATENT DOCUMENTS

| 6,394,692 | B1 * | 5/2002 | Lin | 384/538 |
|---|---|---|---|---|
| 6,682,088 | B1 * | 1/2004 | Lin | 280/280 |
| 7,204,502 | B2 * | 4/2007 | Tange | 280/280 |
| 2001/0022872 | A1 * | 9/2001 | Marui | 384/545 |
| 2003/0059145 | A1 * | 3/2003 | Couturet | 384/545 |

* cited by examiner

*Primary Examiner*—Thomas R Hannon
(74) *Attorney, Agent, or Firm*—Charles E. Baxley

(57) ABSTRACT

A ball bearing assembly for a bicycle comprises a outer race, a ball cage, settled in the outer race, a cap, having a center hole and a ring portion extended axially from the periphery of the center hole, an inner race, with the inner surface thereof closely surrounding the outer surface of the ring portion, and a packing ring which is in an annular shape and having an annular flange around the bottom outer edge so that when the cap is put over the outer race to make the ball cage press upon the ball cage, the packing ring can be inserted into the center hole of the cap, and the flange is retained around the bottom of the ball cage. The disclosed ball bearing assembly is characterized by improved assembling accuracy and automatic center adjusting function.

6 Claims, 6 Drawing Sheets

BALL BEARING ASSEMBLY FOR BICYCLE

BACKGROUND OF THE INVENTION

1. Technical Field

The present invention relates to a ball bearing assembly for a bicycle, and more particularly, to a ball bearing assembly characterized by improved assembling accuracy and automatic center adjusting function.

2. Description of Related Art

The exposition of ball bearing assembly is herein started with a bicycle headset structure, as shown in FIGS. 1 and 2, implementing an upper ball bearing assembly 20 and a lower ball bearing assembly 10.

As can be seen in the drawings, the lower ball bearing assembly 10 comprises an outer race 11, a ball cage 12 and an inner race 13. The inner race 13 is mounted onto a socket 92 positioned between a front fork stem 90 and a front fork 91 of the bicycle. Sequentially, the ball cage 12 is mounted onto the inner race 13 and the outer race 11 is combined with the bottom edge of a head tube 93 of the bicycle. As the front fork stem 90 is pierced into the head tube 93, the ball cage 12 can be firmly positioned between the outer and inner races 11, 13. Regarding the upper ball bearing assembly 20, it includes an outer race 21, a ball cage 22, an inner race 23, a cap 24 and a packing ring 25. The outer race 21 is for being engaged to the top of the head tube 93, and sequentially, the ball cage 22 is settled upon the outer race 21. Said cap 24 presses the top edge of the inner race 23 by a shallow annular grove 241 formed thereon, and the inner race 23 downward pressed on the ball cage 22, whereupon when the packing ring 25 is inserted form a center hole 242 of the cap 24 to compress the inner periphery of the inner race 23, the inner race 23 can be secured with the cap 24 while presses firmly on the ball cage 22. Lastly, the front fork stem 90 is pierced into the packing ring 25 so as to be combined with a head stem (not shown).

According to the previously discussed headset structure, the assembly of the upper ball bearing assembly 20 is dependent on the structure that the cap 24 simply contacts the top edge of the inner race 23 by the annular grove 241. That is to say, there is no any direct and reliable positioning mechanism between the inner race 23 and the cap 24 and the combination therebetween can only be committed to the packing ring 25.

However, some material or structural properties of conventional packing ring 25 might incur problems. For instance, an aluminum-made packing ring 25 can easily suffer deformation due to external force or temperature variation. Also can be noted is a gap 251 provided thereon for flexibly balancing compression force generated by the center hole 242 and the inner periphery of the inner race 23. Nevertheless, the relevant stress can be converged to the point on the packing ring 25 where is opposite to the gap 251, and this may play some role in the deformation of the packing ring 25. Thus it can be seen that the conventional packing ring are subject to deformation and poor structural stability. With such a conventional packing ring, the fastening between the inner race and ball cage can be consequently affected and therefore the assembling accuracy of the entire ball bearing assembly can be in turn depressed.

SUMMARY OF THE INVENTION

The present invention has been accomplished under these circumstances in view. It is one objective of the present invention to provide an improved ball bearing assembly to prevent problems occurred in prior arts.

A ball bearing assembly for a bicycle comprises:
a outer race;
a ball cage, settled in the outer race;
a cap, having a center hole and a ring portion extended axially from the periphery of the center hole;
an inner race, with the inner surface thereof closely surrounding the outer surface of the ring portion; and
a packing ring which is in an annular shape and having an annular flange around the bottom outer edge;
so that when the cap is put over the outer race to make the ball cage press upon the ball cage, the packing ring can be inserted into the center hole of the cap, and the flange is retained around the bottom of the ball cage.

The efficacy of the present invention is that the disclose ball bearing assembly possesses structural stability, assembling accuracy, and automatic center adjusting function. Regarding assembling accuracy, as the packing ring is made by means of plastic injection molding, it is characterized by being stable, well rigid, high tensile strength, high fracture strength, flexible, and light-weighted. The axial length, cone-shaped outer surface and flange can be precisely formed integrally so that the resultant packing ring is facile for being assembled with the cap from the center hole and in turn the inner race can be axially positioned in the cap without miss by the presence of the flange. As assembling accuracy is ensured, structural stability assembly of the entire assembly can be consequently achieved. Additionally, the packing ring also facilitates center adjusting for holding components that are concentrically assembled therewith (e.g. the front fork stem settled in the head tube) at proper relative positions.

DETAILED DESCRIPTION OF THE PREFERRED EMBODIMENT

Figure 1:
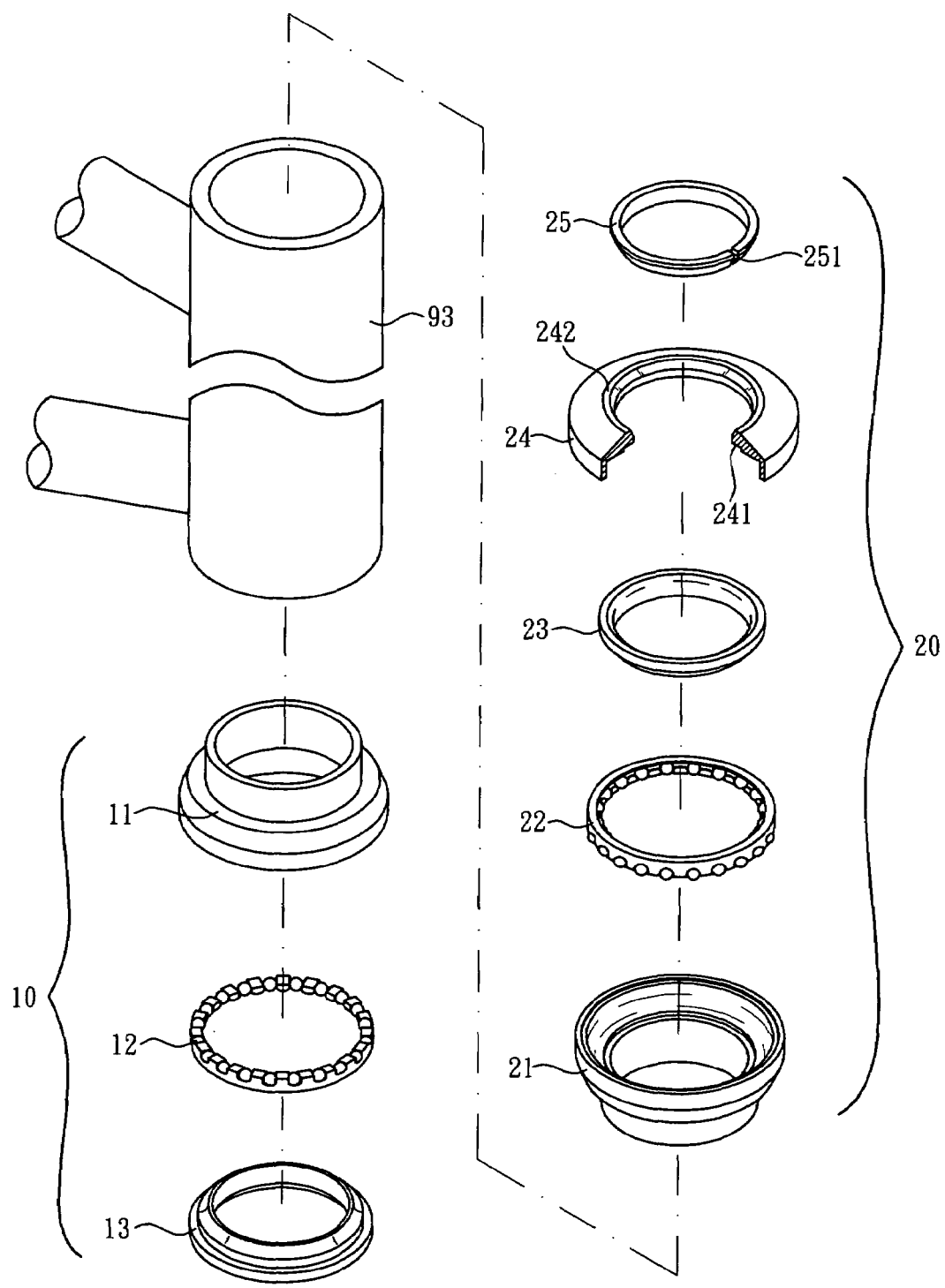
FIG. 1 is an exploded view of an exemplificative bicycle headset structure primarily comprises an upper ball bearing assembly and a lower ball bearing assembly.
Figure 2:
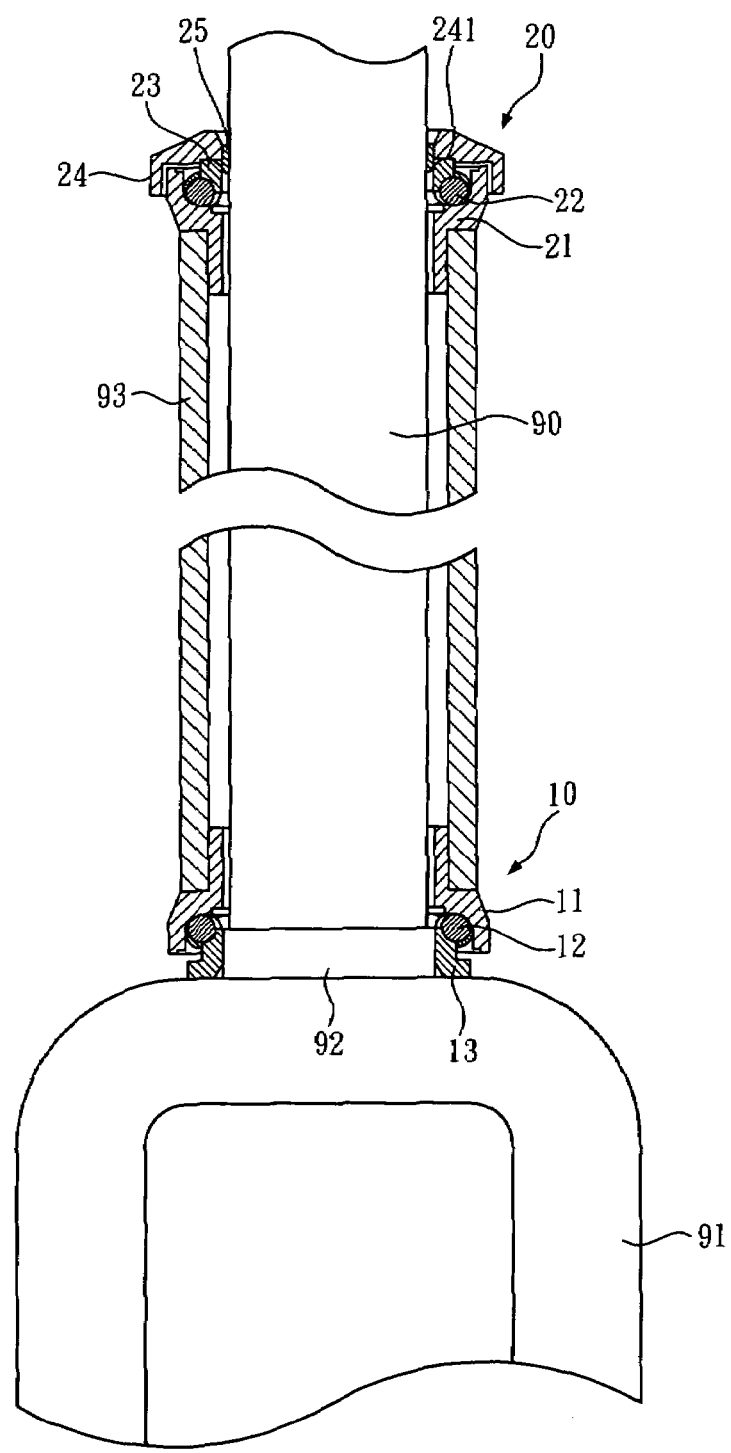
FIG. 2 is a sectional view of the bicycle headset structure of FIG. 1.
Figure 3:
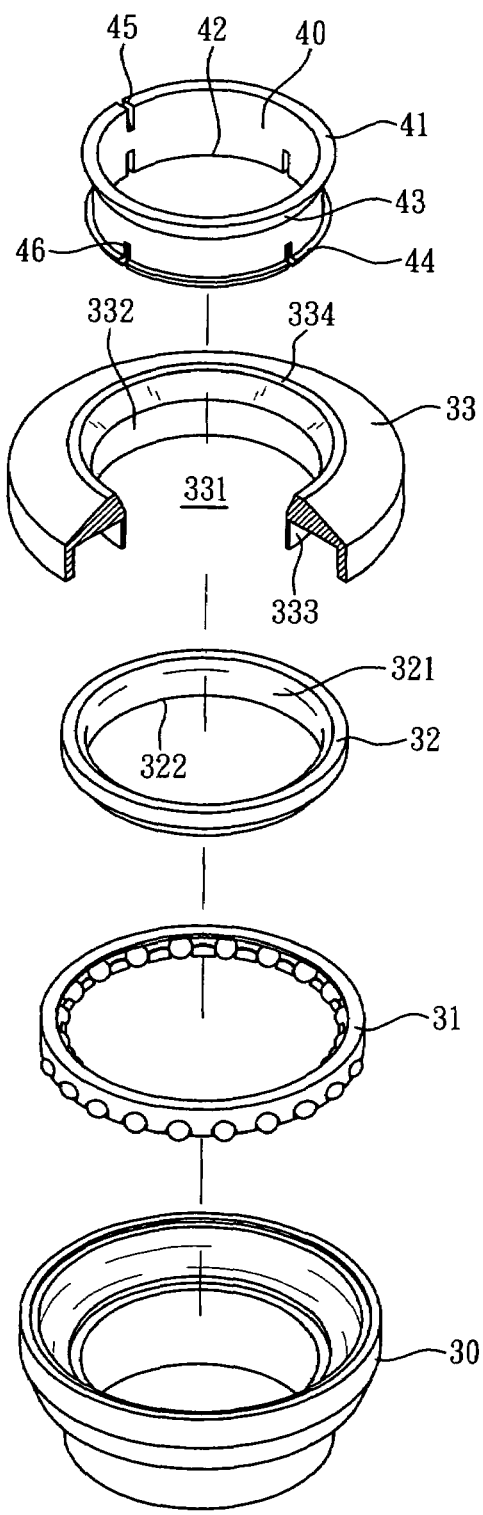
FIG. 3 is an exploded view of the ball bearing assembly of the present invention.
Figure 4:
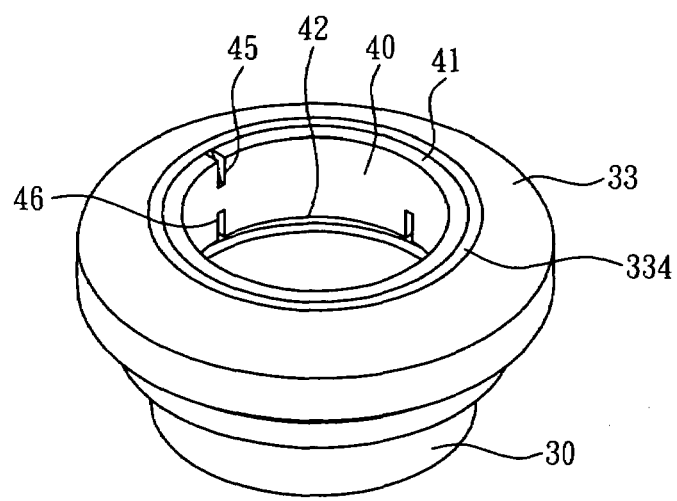
FIG. 4 is a perspective view of the ball bearing assembly of the present invention.
Figure 5:
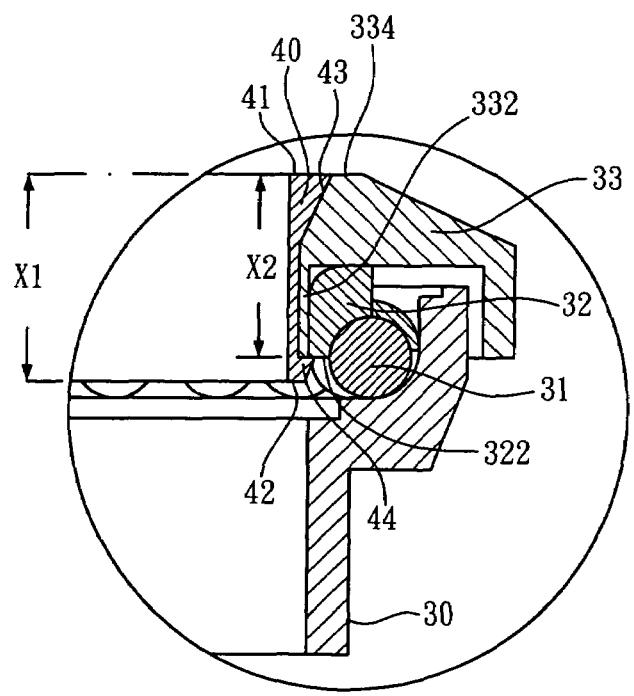
FIG. 5 is a sectional view of the ball bearing assembly of the present invention.

As can be seen in FIGS. 3, 4 and 5, the ball bearing assembly according to the present invention primarily comprises an outer race 30, a ball cage 31, an inner race 32, a cap 33 and a packing ring 40. The ball cage 31 is settled in the outer race 30, and the inner race 32 is positioned correspondingly to the inner top surface of the cap 33. Further, the cap 33 is hooded onto the outer race 30 so that the inner race 32 is pressed on to the ball cage 31 whereupon when the packing ring 40 is inserted form a center hole 331 of the cap 33, the inner race 32 can be radially secured within the cap 33.

Particularly, the cap 33 of the disclosed subject matter has its center hole 331 formed diametrically corresponding to the inner diameter of the inner race 32 and has the periphery of the center hole 331 extended cent ripe tally to form a ring portion 332 with an axial length equal to that of the inner race 32. Thereby, the inner race 32 can has its inner surface closely surrounding an outer surface 333 of the ring portion 332. Accordingly, the inner race 32 can be positively secured within the cap 33.

Additionally, it is proposed that the packing ring 40 of the disclosed subject matter is made of plastic material. The axial length (X1) thereof measured from a top edge 41 to a bottom edge 42 thereof is slightly greater than the axial distance (X2) measured from the top 334 of the center hole 331 to the bottom 322 of the inner race 32. Meantime, the packing ring 40 comprises a cone-shaped outer surface 43, which is extended upwardly, and outwardly from the top edge 41, an annular flange 44 attached at the bottom outer edge 42, and a plurality of longitudinal gaps 45, 46 arranged at the top edge 41 and bottom edge 42 respectively.

Accordingly, when the packing ring 40 is inserted into the center hole 331 of the cap 33, the cone-shaped outer surface 43 can be retained by the cone-shaped surface around the top 334 of the cap 33 while the flange 44 is retained by the bottom 322 of the inner race 32, and the plural gaps 45, 46 can help neutralizing compression force generated by the center hole 331 and the inner periphery of the inner race 32.

Figure 6:
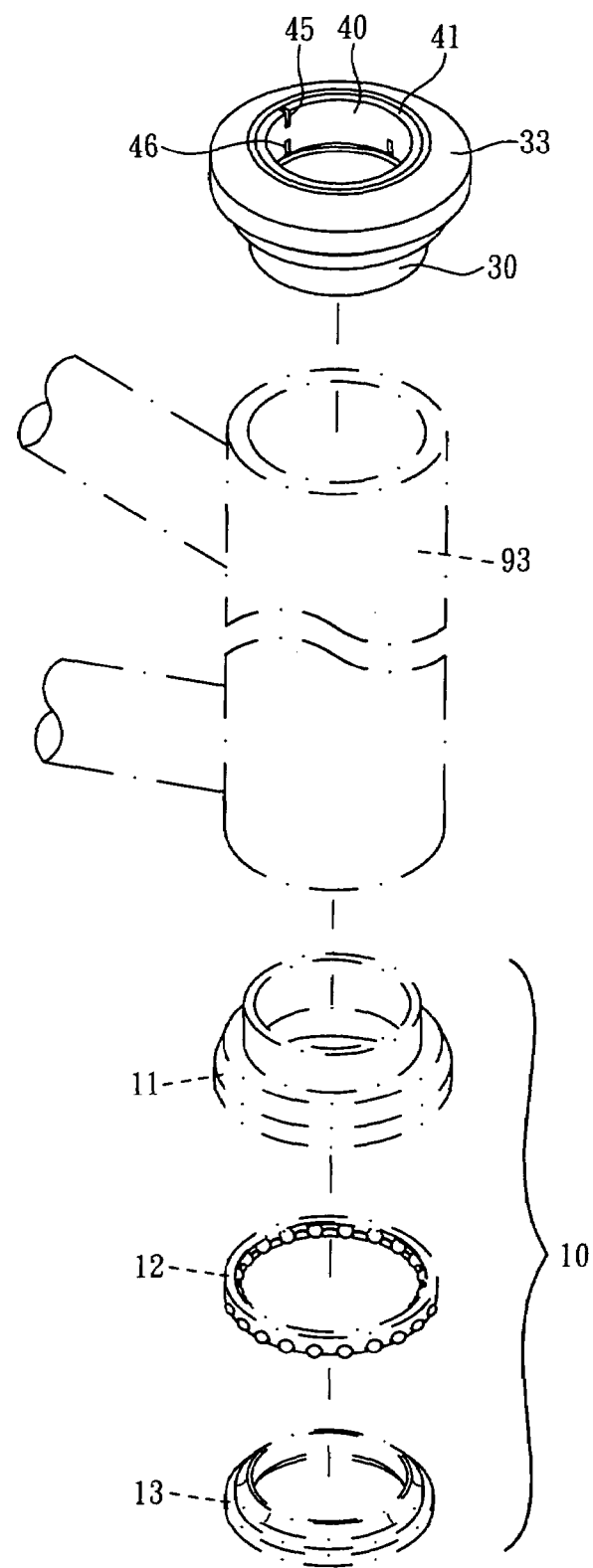
FIG. 6 is an applied view showing the disclosed ball bearing assembly applied to a bicycle headset.
Figure 7:
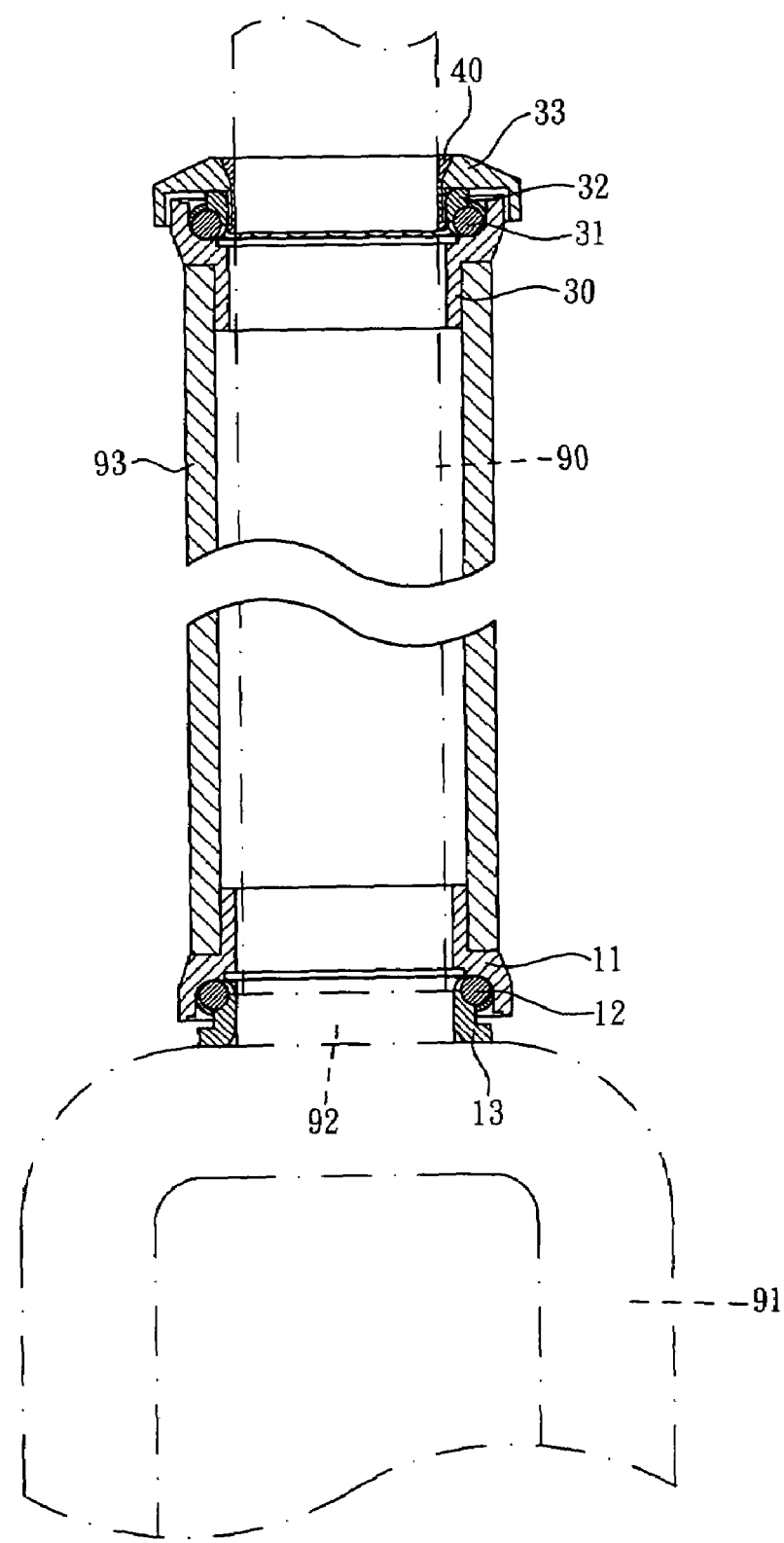
FIG. 7 is a sectional view of the bicycle headset of FIG. 6.

The disclosed ball bearing assembly is applied principally to a bicycle. FIGS. 6 and 7 are herein provided for illustrating one of the embodiments of the present assembled to a bicycle headset. It can be seen that the outer race 30 is mounted onto the upper end of a head tube 93 and the ball cage 31 is installed in the outer race 30. Further, the inner race 32 is configured to the ring portion 332 of the cap 33, and the cap 33 is put over the outer race 30 so that the inner race 32 presses upon the ball cage 31. Afterward, the packing ring 40 is inserted into the center hole 331 of the cap 33 to compress upon the inner periphery of the inner race 32 and the inner race 32 can therefore be firmly secured as previously discussed and inner race 32 can turn press the ball cage 31 stably. After that, a front fork stem 90 is pierced into the head tube 93, and the upper end thereof compresses upon the inner periphery of the packing ring 40 so as to be combined with a head stem (not shown).

In FIGS. 6 and 7, also can be seen is the lower ball bearing assembly 10 which is similar to a conventional one and composed of the outer race 11, the ball cage 12 and the inner race 13. The inner race 13 is mounted onto a socket 92 positioned between a front fork stem 90 and a front fork 91 of the bicycle. Sequentially, the ball cage 12 is mounted onto the inner race 13 and the outer race 11 is combined with the bottom edge of a head tube 93 of the bicycle so that the ball cage 12 can be firmly positioned between the outer and inner races 11, 13. By using the disclosed ball bearing assembly in conjunction with said lower ball bearing assembly, the front fork stem can be retained in a center position with respect to the head tube and thereby, the bicycle can veer with smoothness and balance.

Although the bicycle headset structure is recited for illustrating the present invention, the disclosed ball bearing assembly can be also applied to a crank axle, a hub or other parts of a bicycle that may implement ball bearing assemblies.

The present invention is therefore advantaged by the features of structural stability and assembling accuracy. Regarding assembling accuracy, as the packing ring 40 is made by means of plastic injection molding, it is characterized by being stable, well rigid, high tensile strength, high fracture strength, flexible, and light-weighted. The axial length, cone-shaped outer surface and flange can be precisely formed integrally so that the resultant packing ring 40 is facile for being assembled with the cap from the center hole and in turn the inner race can be axially positioned in the cap without miss by the presence of the flange. As assembling accuracy is ensured, structural stability assembly of the entire assembly can be consequently achieved.

The packing ring 40 of the present invention can also be made through metal processing method instead of injection molding.

Except for bicycles, the disclosed ball bearing assembly may be also applied to exercise equipments or the like.

Although a particular embodiment of the invention has been described in detail for purposes of illustration, it will be understood by one of ordinary skill in the art that numerous variations will be possible to the disclosed embodiments without going outside the scope of the invention as disclosed in the claims.

What is claimed is:

1. A ball bearing assembly for a bicycle comprises:
   a outer race;
   a ball cage, settled in the outer race;
   a cap, having a center hole and a ring portion extended axially from the periphery of the center hole;
   a inner race, with the inner surface thereof closely surrounding the outer surface of the ring portion; and
   a packing ring which is in an annular shape and having an annular flange around the bottom outer edge;
   so that when the cap is put over the outer face the inner race presses upon the ball cage, the packing ring is inserted into the center hole of the cap, and the flange is retained around the bottom of the ball cage.

2. The ball bearing assembly for a bicycle as claimed in claim 1, wherein a cone-shaped surface is formed around the top edge of the center hole of the cap and is in intimate contact with a cone-shaped outer surface formed at the top edge of the packing ring.

3. The ball bearing assembly for a bicycle as claimed in claim 2, wherein at least one gap is provided at the top edge of the packing ring.

4. The ball bearing assembly for a bicycle as claimed in claim 3, wherein at least one gap is provided at the bottom edge of the packing ring.

5. The ball bearing assembly for a bicycle as claimed in claim 4, wherein the packing ring is formed by injection molding.

6. The ball bearing assembly for a bicycle as claimed in claim 4, wherein the packing ring is formed by metal processing.

* * * * *